United States Patent
Parg et al.

(10) Patent No.: US 6,787,604 B2
(45) Date of Patent: Sep. 7, 2004

(54) ADHESIVE COMPOSITION

(75) Inventors: Roland Parg, Leverkusen (DE); Martin Hoch, Heinsberg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/393,612

(22) Filed: Mar. 21, 2003

(65) Prior Publication Data

US 2003/0181586 A1 Sep. 25, 2003

(30) Foreign Application Priority Data

Mar. 25, 2002 (DE) .......................................... 102 13 227

(51) Int. Cl.[7] .............................................. C08L 31/02
(52) U.S. Cl. .............................. 525/88; 525/95; 525/98; 524/505
(58) Field of Search .............................. 525/88, 95, 98, 525/505

(56) References Cited

U.S. PATENT DOCUMENTS

| 4,357,459 A | 11/1982 | Runavot et al. ............ 528/205 |
| 4,412,030 A | 10/1983 | Runavot et al. ............ 524/505 |
| 5,840,783 A | 11/1998 | Momchilovich et al. .... 522/412 |
| 6,117,945 A | 9/2000 | Mehaffy et al. ............ 525/159 |
| 2002/0086175 A1 * | 7/2002 | Parg et al. .................. 428/516 |

FOREIGN PATENT DOCUMENTS

| JP | 20001-142650 | 5/2000 |
| WO | 00/27942 | 5/2000 |
| WO | 2000-137438 | 5/2000 |

OTHER PUBLICATIONS

Kuraray (LIR Technical Information, (month unavailable) 1998, 9, (1000), p 20, Kuraray Europe GmbH, Schiess–Strasse 68, 40549 Dusseldorf, Germany).

Kuraray (LIR Liquid Rubber (month unavailable) 1997, Kuraray Europe GmbH, Schiess–Strasse 68, 40549 Dusseldorf, Germany).

* cited by examiner

*Primary Examiner*—William K Cheung
(74) *Attorney, Agent, or Firm*—Jill Denesvich; Godfried R. Akorli

(57) ABSTRACT

The present invention relates to a composition which comprises at least one triblock copolymer, one terpene resin, one liquid component and one ethylene-vinyl acetate copolymer, and also to a process for preparing this composition, and to its use.

6 Claims, No Drawings

ADHESIVE COMPOSITION

BACKGROUND OF THE INVENTION

The present invention relates to a composition which comprises at least one triblock copolymer, one terpene resin, oneliquid component and one ethylene-vinyl acetate copolymer, and also to a process for preparing this composition, to its use and to a multilayer product comprising the composition of the invention.

The adhesives industry is looking for adhesives which adhere not only to polar articles but in particular to apolar articles as well.

U.S. Pat. No. 4,412,030 discloses hotmelt pressure-sensitive adhesives (hmPSAs) which are composed of a special resin based on phenyl and styrene and/or α-methyl styrene, a triblock diene copolymer and an ethylene-vinyl acetate copolymer. The latter has vinyl acetate contents of up to a maximum of 45% by weight.

EP-A 0 934 990 discloses a hotmelt adhesive composition and its use for bonding paper at 121° C. Among its constituents the claimed composition includes an ethylene-vinyl acetate copolymer having a vinyl acetate content of 40% by weight and a melt flow index ("MFI") of 1000. For the use of this composition on all substrates and articles, the temperature range is unsuitable.

Pressure-sensitive adhesive (PSA) compositions for polyolefin surfaces are disclosed in EP-A 0 822 967. They comprise solution-polymerized acrylates with chlorinated polyolefins and hydrocarbon tackifiers.

U.S. Pat. No. 4,357,459 describes a styrene resin which is modified by Friedel-Crafts reaction and which can be reacted together with acrylates or ethylene-vinyl acetate copolymers as a hotmelt adhesive (hm) or as a pressure-sensitive adhesive (PSA). Ethylene-vinyl acetates having a low vinyl acetate content are used.

JP-A 2000 142 650 mentions a hotmelt adhesive (hma) which is based on ethylene-vinyl acetate copolymers and is applied to moving objects at 70° C.

The adhesive composition in JP-A 2000 137 438 is based on an ethylene-vinyl acetate copolymer prepared so as to be detachable from glass surfaces.

WO 00/27942 describes a paper label comprising ethylene-vinyl acetate copolymer in an adhesive bond. This bond is generally unsuitable for very smooth surfaces such as plastics.

In product information literature from Kuraray (LIR Technical Information 1998,9 (1,000), p. 20, Kuraray Europe GmbH, Schiess-Strasse 68, 40549 Dusseldorf, Germany) hotmelt adhesive mixtures are disclosed which differ from the present invention only in the vinyl acetate content of the ethylene-vinyl acetate copolymers used. The product with an increased vinyl acetate content of 40% by weight shows no increase in tack over a vinyl acetate content of 28% by weight. For the product with the increased vinyl acetate content it is possible to observe poorer adhesion to PE than for the product with the lower vinyl acetate content.

The state of the art presents a variety of adhesives which are tailored to the particular material on which they are used but which do not adhere to smooth, relatively-polar and also apolar surfaces of thermoplastics.

The object of the present invention is, therefore, to provide a composition which adheres both to polar and to apolar surfaces of thermoplastics and which allows an adhesive for thermoplastic surfaces to be provided.

DESCRIPTION OF THE INVENTION

The above object is achieved by means of a composition comprising:

a) from 10% by weight of 50% by weight of a triblock copolymer of the formula (I)

$$ABA, \qquad (I)$$

where
A is a block containing repeating units derived from styrene or substituted styrene and
B is a block containing repeating units derived from one or more different dienes and the fraction of repeating units derived from styrene or substituted styrene in the two A blocks is in total from 10 to 40% by weight, b) from 10% by weight to 60% by weight of an alicyclic terpene resin, c) from 10% by weight to 40% by weight of a component which is liquid at 20° C. and is selected from the group consisting of a diene polymer, a poly-α-olefin, a refined mineral oil fraction comprising saturated aliphatic hydrocarbons and mixtures thereof, d) from 10% by weight to 40% by weight of an ethylene-vinyl acetate copolymer whose vinyl acetate content is more than 40% by weight, and e) from 0 to 30% by weight of further additives.

In the composition of the invention the MFI of the ethylene-vinyl acetate copolymer used, measured in accordance with DIN 53 735 at 190° C. under a load of 2.16 kg, is preferably below 25.

For the alicyclic terpene resins of the composition of the invention it is advantageous to use terpenes which have an R&B point in the range from 80 to 150° C.

In the composition according to the invention refined mineral oil fractions preferably having a melt viscosity of a maximum of 10,000 poise at 38° C., are preferred for the component which is liquid at 20° C.

In the case of the present composition, preference is given to a vinyl acetate content in the ethylene-vinyl acetate copolymer of more than 50% by weight.

The commixing of the constituents is the preferred process for preparing the composition of the invention.

The present composition is preferably used as an adhesive.

The present composition is preferably employed for bonding labels, for bonding films in the packaging industry, and in the construction industry.

Preference is given to multilayer products which comprise the composition of the invention.

The composition of the invention is used with advantage as an adhesive. This adhesive, even at relatively low temperatures, exhibits a high bond strength and good adhesion to polar substrates such as polyesters, polycarbonates, polyamides, ABS etc. At the same time it exhibits good adhesion to relatively apolar thermoplastics as well. This relates in particular to polyolefins. Moreover, while being suitable at the same time for use as PSAs, these adhesive compounds also exhibit typical properties, of hotmelt adhesives (hm). One typical properties of hotmelt adhesives (hm) is that they become liquid at temperatures in the range $\geq 150°$ C., so allowing application via pumps and nozzles. The typical property of the PSA is that at just 20° C. the PSA has a tack sufficient to allow application.

Under the customary conditions the composition of the invention is water resistant, because hydrolysis does not occur in the presence of moisture. Unlike polyesters and polyurethanes, for example, the main chain of the ethylene-vinyl acetate copolymer is not attacked. The ethylene-vinyl acetate copolymer of the composition of the invention makes it easier to mix in polar components, since the ethylene-vinyl acetate copolymer contributes increased polarity and hydrophilicity and so allows better interaction in particular with wash waters.

The composition of the invention contains advantageously from 10 to 50% by weight of a triblock copolymer. Preference is given to from 20 to 40% by weight of the triblock copolymer.

The triblock copolymer of the composition of the invention is preferably a tricopolymer of the formula ABA, in which A is a block which preferably contains repeating units of styrene or substituted styrenes.

Substituted styrenes are known and include such materials as alkyl-substituted styrenes. One preferred substituted styrene is α-methylstyrene.

The B block of the triblock copolymer of the composition of the invention preferably contains repeating units derived from one or more different dienes.

The dienes used in the B block of the triblock copolymer are the dienes known to the person skilled in the art, preferably butadiene and isoprene or mixtures thereof.

The B block of the triblock copolymer may also be partly or fully hydrogenated. In this case it is preferred to use ethylene-butylene and/or ethylene-propylene blocks.

It is also possible, in addition to linear block copolymers, to use products with a branched and star-shaped structure, as described, for example, in EP-A 0 798 358.

These triblock copolymers provide for a sufficiently high force of cohesion and a partly elastic behaviour of the composition of the invention. They make it possible for even liquid components to be incorporated readily into the composition of the invention.

The composition of the invention advantageously contains from 10 to 60% by weight of an alicyclic terpene resin. Preference is given to from 20 to 50% by weight of the alicyclic terpene resin.

The alicyclic terpene resins of the composition of the invention are formed preferably by Friedel-Crafts polymerisation of appropriate mineral oil cracking fractions. These mineral oil cracking fractions preferably contain α- or β-pinene, dipentene or limonene. The polymerisation of these monomers is preferably conducted cationically with initiation by Friedel-Crafts catalysts.

The alicyclic terpene resins of the composition of the invention are to be understood as including copolymers of the terpenes, especially α- and β-pinene, and also limonene and other monomers.

It is preferred to use alicyclic terpene resins with a low level of aromatics. In this way it is possible to avoid instances of product discoloration.

The alicyclic terpene resins used have an R&B point (Ring & Ball point, determinable in accordance with ASTM D-36-70, using, for example, a Walter Herzog R&B apparatus, model MC-735) which is preferably in the range from 80 to 160° C.

The alicyclic terpene resins of the composition of the invention preferably have a viscosity in the range from 500 mPas to 10 000 mPas after melting.

The composition of the invention advantageously contains from 5 to 40% by weight of a component which is liquid at 20° C. Preference is given to 10 to 30% by weight of the liquid component. The component of the composition of the invention that is liquid at 20° C. preferably comprises diene polymers or a refined mineral oil fraction which comprises saturated, aliphatic hydrocarbons.

The diene polymers of this liquid component of the composition of the invention are customary diene polymers of low molecular mass, especially n-polybutadiene, n-polyisoprene, and low molecular mass polyisobutylenes. It is also possible to use poly-α-olefins which are liquid at 20° C., especially polypropylene, polybutylene and hydrogenated polybutadienes, as the liquid component.

The mineral oil fractions of the liquid component of the composition of the invention are advantageously paraffinic or naphthene-based mineral oils. These mineral oils include preferably linear, preferably branched or cyclic aliphatics having $C_5$ to $C_{50}$ atoms. Preference is given to those linear, branched or cyclic aliphatics having $C_5$ to $C_{40}$ atoms.

Among the cyclic aliphatics, preference is given to the fractions which are composed of cyclopentanes and cyclohexanes or the alkylated derivatives thereof.

The composition of the invention contains advantageously from 10 to 40% by weight of an ethylene-vinyl acetate copolymer. Preference is given to from 15 to 30% by weight of the ethylene-vinyl acetate copolymer.

The ethylene-vinyl acetate copolymers of the composition of the invention preferably possess a vinyl acetate content of more than 50% by weight. With preference the vinyl acetate content of the ethylene-vinyl acetate copolymer is situated in the range from 60 to 85% by weight. It is preferred to use an ethylene-vinyl acetate copolymer having an MFI in the range from 3 to 20, measured in accordance with DIN 53 735 at 190° C. under a load of 2.16 kg.

The ethylene-vinyl acetate copolymer is extraordinarily resistant to ageing effects which are triggered by heat, oxygen, ozone and light The composition of the invention advantageously contains from 0 to 30% by weight of further additives. The composition of the invention preferably contains from 0 to 15% by weight of further additives.

As further additives for the composition of the invention it is preferred to use hydrophilic components as described in JP-A 11 224 052. These hydrophilic components may in particular be surfactants and resin acids, but also copolymers with acid function such as ethylene-acrylic acid copolymers. The detachability of the labels, films, etc. from the substrates to which they are adhered may be optimised by way of these hydrophilic components.

For the purpose of achieving high shear strengths at high temperatures, the composition may also be crosslinked following application. Crosslinking of this kind is possible by means of electron beams or by UV radiation and is especially suitable for thin layers.

The extent of crosslinking must be controlled well in order not to lose too much tack.

Crosslinking with electron beams is especially advantageously with compositions of the invention, since the ethylene-vinyl acetate copolymer with a vinyl acetate content $\geq 50\%$ by weight which they contain is particularly easy to crosslink; that is, can be crosslinked with low radiation doses. It suffers virtually no loss in its tack, while the cohesive forces increase.

The compositions of the invention are designated hotmelt adhesives (hm) because they must be mixed in a melting operation. The tacky, elastic masses obtained have a tack in the range from 0.5 to 1.0 $N/mm^2$ even at 20° C. and can therefore be regarded as being PSAs.

Solvent-free application to substrates or films, including release liners, can be carried out by way of corresponding applicators such as flat dies or blade applicators at temperatures in the range of 140–170° C.

The composition of the invention is employed advantageously for bonding labels. By way of labels, a very wide variety of substances can be bonded to a variety of materials. As labels it is preferred to choose those made of paper.

The materials to which bonding is to take place are customary thermoplastics, preferably polyesters, polycarbonates, polyamides and ABS, but also polyolefins, especially polyethylene and polypropylene.

The composition of the invention can also be used in films in the packaging sector.

Furthermore, it is possible to use the composition of the invention to effect temporary or permanent fixing of film materials such as low-density polyethylene (LDPE), ethylene-vinyl acetate, etc., in sectors including, for example, the construction sector.

Depending on the field of use it is advantageous to select the other components of the composition of the invention that are to be used, besides the ethylene-vinyl acetate copolymer, in accordance with their stability with respect to ageing and weathering.

Preference is given to hydrogenated dienes as the B block in the triblock copolymer and to hydrogenated low molecular mass dienes as the liquid component of the composition of the invention in order to ensure better ageing and weathering.

EXAMPLES

Materials Used

VA27: An ethylene-vinyl acetate copolymer having a vinyl acetate content of 27% by weight, a density of 0.952 g/cm3, an MFI (melt flow index) of 3 (measured in accordance with ASTM D 1238) and a melting point of 71° C. (Escorene® UL 00328 from Exxon).

VA68: An ethylene-vinyl acetate copolymer having a vinyl acetate content of 68% by weight, a density of 1.08 g/cm3, an MFI of 30 (DIN 53 735 at 190° C. and 2.16 kg); the product has no melting point and is completely amorphous (VP KA 8896 from Bayer AG, Leverkusen).

VA80: An ethylene-vinyl acetate copolymer having a vinyl acetate content of 80% by weight, a density of 1.12 g/cm3, an MFI of 5 (DIN 53 735 at 190° C. and 2.16 kg); the product has no melting point and is completely amorphous (Levamelt® 800 from Bayer AG, Leverkusen).

Kraton® D-1161 NU: A triblock copolymer (SIS (styrene-isoprene-styrene)) having a styrene content of 15% by weight, a specified molar weight of from 207 to 237 kg/mol and a melt index of 12 (measured in accordance with ISO 1133 at 200° C. and 5 kg load) (from Kraton Polymers).

LIR-30: A polyisoprene which is liquid at 20° C. and has a specified molar weight of 29 g/mol and a viscosity of 740 poise (38° C.) (from Kuraray).

Resin Px1000: An alicyclic terpene resin having a softening point of 100° C. (from Yasuhara Chemicals).

Vulkanox® BKF: A phenolic antioxidant: 2,2'-methylene-bis(4-methyl-6-tert-butylphenol) (from Bayer AG, Leverkusen).

Mixture Preparation

Compositions were produced in accordance with the following formula: Resin Px1000 was melted and after 2 minutes the ethylene-vinyl acetate copolymer was added. After one minute Kraton D-1161 NU and, finally, after a further minute Vulkanox® BKF was added. Mixing was continued for 30 minutes in order to ensure that the components were homogeneously mixed.

Then the LIR-30 was added slowly and the mixture was stirred for a further 10 to 15 minutes. The cooling was then switched off and, after 10 minutes, the mixture, which had become somewhat more viscous, was removed.

TABLE 1

Amounts data of the composition (hm mixture) 1,2 and 3
Figures in parts, 1 part = 0.62 g based on 100 parts of polymer, polymer
meaning the composition of VA, LIR-30 and Kraton ® D-1161 N.

| Components | Comparative 1 | Inventive 2 | Inventive 3 |
|---|---|---|---|
| P x 1000 | 60 | 60 | 60 |
| VA27 | 30 | | |
| VA68 | | 30 | |
| VA80 | | | 30 |
| Kraton ® D-1161 NU | 40 | 40 | 40 |
| Vulkanox ® BKF | 1 | 1 | 1 |
| LIR-30 | 30 | 30 | 30 |
| Appearance of the mixture | grey, slightly transparent | white | white |
| Cloud point (Kofler bench) | coalesces at 230–250° C., from 230° C. only slightly cloudy, at 250° C. completely clear | still slightly cloudy at 260° C. | Still slightly cloudy at 260° C. |

As compared with the state of the art, compositions having a vinyl acetate content well above 40% by weight were attained and then, surprisingly, the advantageous results below were achieved.

Tack Investigations on the Composition

The substrates were cut from the respective material in the form of circular test specimens having a diameter of 8 millimetres and were bonded to stainless steel dies using quick-setting cyanoacrylamide adhesive.

The substrates were as follows:
ABS Polymer Plates of Novodur® P2L-AT from Bayer AG, Leverkusen
PET polymer: Plates of Guttagliss Solair Extra made of Polyclear for greenhouses
Wood: Glued wood with topmost beechwood lamination, adjusted to fire protection class B1
LDPE film: Standard construction film 80 μm
Glass: Standard glass
Polycarbonate: Plates of Makrolon® 1143 from Bayer AG, Leverkusen, surface not treated An LDPE film (adhesive backing) was coated using a 400 μm doctor blade with a solution of a composition and was dried overnight in air. The film thickness after drying was approximately 50 μm. The solvent was a mixture of toluene, ethyl acetate and methanol in a ratio of 50:30:20 parts by volume. This coated LDPE film was then bonded with a cyanoacrylate, adhesive to an aluminium panel which served as sample support. This application from solution was used as the application technique for experiments, owing to the greater ease of handling of the composition.

Measurement Procedure

Description of the tack measurement instrument:

The measurement area consists of an underlay on which there is the LDPE film coated with the composition of the invention. The measuring instrument is composed of a measuring die covered with a circular platelet of the substrate. Die and substrate platelet are firmly bonded to one another. The die can then be positioned by robot freely on the adhesive film of the underlay with a defined contact force for a defined contact time, before the force of removal required to raise the die is determined with the means of a load cell.

The measurements were carried out with the tack measuring instrument at 20° C. 5 individual measurements were carried out on each batch, in each case against all of the samples. Contact was made with a pressure of p=10 bar for a period of 10 seconds. After this contact time, the assembly was separated at a removal rate of 2 mm/s.

Values Obtained

TABLE 2

|  | Hotmelt adhesive 1 | | Hotmelt adhesive 2 | | Hotmelt adhesive 3 | |
| --- | --- | --- | --- | --- | --- | --- |
|  | Tack N/mm$^2$ | Separation energy N/mm$^2$ | Tack N/mm$^2$ | Separation energy N/mm$^2$ | Tack N/mm$^2$ | Separation energy N/mm$^2$ |
| Makrolon | 0.50 | 0.133 | 0.50 | 0.108 | 0.68 | 0.188 |
| Novodur | 0.55 | 0.128 | 0.44 | 0.134 | 0.65 | 0.278 |
| Wood | 0.46 | 0.110 | 0.32 | 0.102 | 0.56 | 0.281 |
| PET | 0.38 | 0.082 | 0.42 | 0.085 | 0.52 | 0.232 |
| LDPE | 0.77 | 0.318 | 0.53 | 0.180 | 0.60 | 0.337 |
| Glass | 0.75 | 0.160 | 0.78 | 0.154 | 0.92 | 0.235 |

Roller Peel Tests

In addition, peel tests were conducted in these tests, various substrate films (PC, ABS, PET, LDPE) or substrate plates (wood, metal, glass) were coated with the composition by the solution process, as described for the tack measurements, and laminated to an LDPE film and also to a Teflon film. This construction was then used for determining the peel force at 90°, with the maximum and the average force being determined in each case. The values from the Teflon film served as a reference for the adhesion to a material of relatively low surface forces.

Performance of the Measurement:

TABLE 3

Results of the 90° roller peel tests

Peel rate = 1.67 mm/s

| [N] |  | hm 1 | hm 2 | hm 3 |
| --- | --- | --- | --- | --- |
| LDPE/PC | F-max | 2.42 | 1.26 | 2.49 |
|  | F-average | 1.52 | 0.93 | 1.70 |
| Teflon/PC | F-max | 1.29 | 1.90 | 2.06 |
|  | F-average | 0.81 | 1.40 | 1.57 |
| LDPE/ABS | F-max | 2.08 | 1.25 | 2.79 |
|  | F-average | 1.19 | 0.86 | 1.87 |
| Teflon/ABS | F-max | 0.91 | 1.48 | 1.93 |
|  | F-average | 0.50 | 1.04 | 1.47 |
| LDPE/PET | F-max | 1.98 | 1.26 | 3.27 |
|  | F-average | 1.24 | 0.93 | 1.99 |
| Teflon/PET | F-max | 1.13 | 1.27 | 1.82 |
|  | F-average | 0.46 | 0.91 | 1.29 |
| LDPE/LDPE | F-max | 0.85 | 1.32 | 3.52 |
|  | F-average | 0.51 | 0.67 | 2.31 |
| Teflon/LDPE | F-max | 2.16 | 0.94 | 1.86 |
|  | F-average | 1.24 | 0.54 | 1.01 |
| LDPE/Metal | F-max | 2.25 | 2.17 | 3.18 |
|  | F-average | 1.19 | 1.51 | 2.16 |
| Teflon/metal | F-max | 0.83 | 1.83 | 2.17 |
|  | F-average | 0.40 | 1.20 | 1.49 |
| LDPE/glass | F-max | 1.68 | 1.69 | 2.87 |
|  | F-average | 1.17 | 1.18 | 1.70 |
| Teflon/glass | F-max | 1.26 | 1.37 | 1.83 |
|  | F-average | 0.87 | 0.97 | 1.14 |
| LDPE/wood | F-max | 1.36 | 1.86 |  |
|  | F-average | 0.72 | 0.97 |  |
| Teflon/wood | F-max | 0.64 |  |  |
|  | F-average | 0.27 |  |  |

Comparison of the Tack Measurements of the Compositions of the Invention with the Comparative Tests Composition (hm) 1 possesses only moderate adhesion on the test substrates, with the exception of LDPE. The latter can be explained by the relatively low polarity of the ethylene-vinyl acetate copolymer used, which produces better compatibility with the apolar LDPE.

In composition (hm) 2 an ethylene-vinyl acetate copolymer is used which is likewise very polar with a vinyl acetate content of 68% by weight. This ethylene-vinyl acetate copolymer has a particularly high MFI and is therefore unable to make virtually any contribution to cohesive strength.

The composition 2 (hm) therefore achieves values equal to those of comparative 1.

Composition (hm) 3 has the highest tack values in all cases, except in the case of LDPE, and also the highest separation energies. In respect of the polar thermoplastic substrates such as polycarbonate, ABS and PET, markedly higher tack values and separation energies are achieved with composition 4. Moreover, the best values are achieved on wood and glass as well.

The advantage of composition (hm) 3 is that markedly improved adhesive values are achieved on polar substrates while at the same time high values with respect to apolar thermoplastics such as LDPE are retained.

These effects are surprising since the compositions of the invention are still multi-phase at the application temperatures chosen here and hence the effect of the more polar formulation component ethylene-vinyl acetate copolymer was not foreseeable.

Comparison of the Peel Tests of the Compositions of the Invention with the Comparative Composition The peel tests with Teflon film and various substrates essentially reproduce the adhesion forces between the composition and the Teflon film. They are a measure of the tack of the composition in the horizontal direction. It is found that the values obtained for the composition (hm) 2 and 3 are higher in almost all cases than those for the composition (hm) 1. With composition 2 high values are obtained, since it can be assumed that the high MFI and thus the low molar weight of the ethylene-vinyl acetate copolymer it contains leads to high tack. The values of composition 3 are even higher.

Only in the case of the LDPE film does composition (hm) 1 (comparative) display the highest values, with composition (hm) 3 giving at least similar peel forces.

The peel tests with LDPE film and various substrates are influenced both by adhesion forces and also cohesive forces of the composition.

The composition (hm) 3 yields high values on metal and glass as substrate. Composition (hm) 2 here shows a similar behaviour to that of composition (hm) 1. In the case of the measurements with the thermoplastic films (ABS, PET and LDPE) against LDPE, composition (hm) 3 is more suitable. Only in the case of LDPE against PC do the compositions (hm) 1 (comparative) and 3 show similar values.

In the case of the LDPE/LDPE construction, particularly high peel forces are measured with composition (hm) 3, which were not to have been expected in the light of the tack values and the separation energies.

This was not to be expected because the ethylene-vinyl acetate copolymer of the invention, with a high vinyl acetate content, is particularly polar and not very compatible with the apolar LDPE.

It can be stated that compositions of type 2 and 3 which contain a vinyl acetate content of more than 40% by weight give values which in almost all cases are higher than those of the comparative tests. The targeted use of the ethylene-vinyl acetate copolymers of high vinyl acetate content makes it possible to increase the adhesion on polar substrates in particular. The compositions of the invention can therefore be employed on substrates of different polarity.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising:
    a) from 10% by weight of 50% by weight of a triblock copolymer of the formula (I)

$$ABA, \qquad (I)$$

where
    A is a block containing repeating units derived from styrene or substituted styrene and
    B is a block containing repeating units derived from one or more different dienes and the fraction of repeating units derived from styrene or a styrene derivative in the two A blocks is in total from 10 to 40% by weight,
    b) from 10% by weight to 60% by weight of an alicyclic terpene resin,
    c) from 10% by weight to 40% by weight of a component which is liquid at 20° C., which is selected from the group consisting of selected from the group consisting of a diene polymer, a poly-α-olefin, a refined mineral oil fraction comprising saturated aliphatic hydrocarbons and mixtures thereof, and
    d) from 10% by weight to 40% by weight of an ethylene-vinyl acetate copolymer whose vinyl acetate content is more than 40% by weight.

2. The composition of claim 1, wherein the MFI value of the ethylene-vinyl acetate copolymer, measured in accordance with DIN 53 735 at a temperature of 190° C. under a load of 2.16 kg, is below 25.

3. The composition of claim 1, wherein the alicyclic terpene resin comprises terpenes having an R&B point in the range from 80 to 150° C.

4. The composition of claim 1, wherein the component which is liquid at 20° C. is a diene polymer.

5. The composition of claim 1, wherein the vinyl acetate content in the ethylene-vinyl acetate copolymer is more than 50% by weight.

6. A process for preparing the composition of claim 1, comprising mixing:
    a) from 10% by weight of 50% by weight of a triblock copolymer of the formula (I)

$$ABA, \qquad (I)$$

where
    A is a block containing repeating units derived from styrene or substituted styrene and
    B is a block containing repeating units derived from one or more different dienes and the fraction of repeating units derived from styrene or a styrene derivative in the two A blocks is in total from 10 to 40% by weight,
    b) from 10% by weight to 60% by weight of an alicyclic terpene resin,
    c) from 10% by weight to 40% by weight of a component which is liquid at 20° C., which is selected from the group consisting of selected from the group consisting of a diene polymer, a poly-α-olefin, a refined mineral oil fraction comprising saturated aliphatic hydrocarbons and mixtures thereof, and
    d) from 10% by weight to 40% by weight of an ethylene-vinyl acetate copolymer whose vinyl acetate content is more than 40% by weight.

* * * * *